Patented Oct. 12, 1943

2,331,394

UNITED STATES PATENT OFFICE 2,331,394

BITUMINOUS COMPOSITION AND METHOD FOR PRODUCING THE SAME

Sixten Magnus Hjelte, Stockholm, Sweden

No Drawing. Application September 30, 1941, Serial No. 413,077. In Sweden May 25, 1940

3 Claims. (Cl. 106—281)

The present invention relates to a bituminous composition and to a method for producing the same. More particularly it relates to compositions of tar, asphalt or other bituminous matter and a mineral filler comprising precipitated calcium carbonate, which compositions are particularly adapted to be used for paving, flooring, roofing and insulation purposes, for water proofing metallic surfaces such as for coating pipes or other metallic materials, and as an adhesive or binding agent of high tensile strength.

It is an object of my invention to provide a method for incorporating precipitated calcium carbonate into bituminous substances.

Lime sludge is a product found usually as a refuse product of sugar factories and obtained in large quantities in the refining of beet-sugar. It is a calcined limestone which has taken up carbonic acid in the purifying process and is practically a carbonate of lime. On account of its relatively high content of water—about 50%—such lime sludge before being added to hot bitumen has previously been heated in order to evaporate the water since otherwise overboiling of the composition would take place. However, when dried the said lime sludge forms hard lumps which, before being mixed with the hot liquid, must be crushed and thoroughly pulverized. This treatment of the lime sludge is relatively expensive and, moreover, a composition of non-settling properties is not thus obtainable as the particle sizes of such pulverized filler still range between 10–100 mu. In fact, the particles of dried pulverized lime sludge are composed of a lot of primary grains with a particle size of about 1 mu.

According to the invention, better results are obtained when lime sludge in a moisty condition is mixed with hot bitumen and suddenly heated to a temperature beyond that of steam-generation. When abruptly heated, the liquid film which combines the calcium carbonate particles of crystals, of the sludge is transformed into steam at an almost explosive rate, whereby the lumps burst into their constituents, i. e. their primary grains.

Hence, the filler is mixed with the bituminous matter, asphalt, pitch, tar and the like when the liquid is heated to a temperature above that of steam-generation and preferably to a temperature suitable for a rapid steam-generation, for instance 150° centigrade. The moisture content may vary within wide limits without noticeable disadvantage, but, of course, the degree of moisture ought not to be greater than necessary for the complete disintegration or bursting of the lime sludge lumps into their primary grains. When the quantity of water in the filler is too large, the temperature of the bitumen must be increased. I have made a rule to add the moisty calcium carbonate filler to the hot bitumen in such quantities as will not cause the temperature of the liquid to fall much below 150° centigrade.

Superior results are obtained when using for the same purposes the lime sludge from pulp mills, which is a waste or by-product obtained in the form of a precipitate of calcium carbonate in the causticization of soda by milk of lime in preparing the cooking liquor used in the manufacture of pulp. Since this lime sludge is precipitated at a high temperature from a concentrated, hot solution of NaOH and $Na_2CO_3$, which is causticized, a double salt of the formula $Na_2Ca(CO_3)_2 \cdot 2H_2O$ is formed. This double salt reacts in quite a favourable manner when added to tar as asphalt, as, it has a weak alkaline reaction and neutralizes acids and acid constituents which are present especially in tar. When not neutralized, such acid constituents will cause deterioration of the composition after a period of time. The lime sludge from sugar factories does not possess these good qualities since no such double salt is present. On the contrary, such lime sludge contains organic impurities, viz. sugar, albuminous substances, organic acids etc., which are harmful in this connection, as, when becoming putrid such impurities render the composition blistery.

I am aware that when producing emulsions of bitumen moisty lime sludge is mixed with for example hot asphalt, the temperature of the latter, however, being not over 100° centigrade. The present invention does not relate to such emulsions.

Further I am aware that it is previously known to mix molten asphalt with a finely divided mineral filler such as diatomaceous earth, rock dust, marble dust, limestone dust and the like, in order to produce a rough filled asphalt and then subjecting the filled asphalt to agitation with steam at a temperature of approximately 150° centigrade for a sufficient period of time to remove substantially all of the air and moisture from the filled asphalt. In this case there is no question of bursting of any crystal flocks of the filler by means of the steam agitation and, on account of the relatively great particle size of this kind of filler a composition of non-settling properties is not obtainable in this way.

What I claim and desire to secure by Letters Patent is:

1. A method for the production of a composition of bituminous material and a filler comprising precipitated calcium carbonate having a particle size of the order of about 1 mu, which method comprises heating the bituminous material to a temperature of the order of about 150° C., and incorporating lime sludge having a particle size predominantly within the range 10-100 mu into the resultant hot bituminous material in such quantities that the temperature of the mass does not drop appreciably below the aforesaid temperature, whereby the sludge particles are disrupted into primary grains with a particle size of about 1 mu.

2. A method as in claim 1 in which the filler comprises lime sludge obtained as a waste or by-product in the refining of beet-sugar.

3. A method as in claim 1 in which the filler comprises lime sludge obtained as a waste or by-product in the causticization of soda by milk of lime in pulp.

SIXTEN MAGNUS HJELTE.